United States Patent [19]
Gillette

[11] Patent Number: 5,152,946
[45] Date of Patent: Oct. 6, 1992

[54] PRODUCING LOW SHRINK PACKAGING FILM

[75] Inventor: Paul C. Gillette, Newark, Del.

[73] Assignee: Hercules Incorporated, Wilmington, Del.

[21] Appl. No.: 648,503

[22] Filed: Jan. 30, 1991

[51] Int. Cl.$^5$ ............................................. B29C 61/02
[52] U.S. Cl. .................................. 264/230; 264/235.8; 264/289.6; 264/342 RE; 264/346
[58] Field of Search ............... 264/235.8, 235.6, 289.6, 264/342 RE, 346, 230

[56] References Cited

U.S. PATENT DOCUMENTS

| | | | |
|---|---|---|---|
| 3,361,728 | 1/1968 | Coen et al. | 264/342 RE |
| 3,508,944 | 4/1970 | Henderson et al. | 117/7 |
| 3,570,052 | 7/1972 | Reade | 18/1 |
| 3,632,733 | 1/1972 | Yazawa | 264/235.8 |
| 3,671,383 | 6/1972 | Sakata et al. | 161/252 |
| 4,343,852 | 8/1982 | Isaka et al. | 428/216 |
| 4,390,385 | 6/1983 | Ferguson et al. | 156/229 |
| 4,415,523 | 11/1983 | Barham et al. | 264/235.8 |
| 4,436,888 | 3/1984 | Copple | 264/342 RE |
| 4,597,920 | 7/1986 | Golike | 264/289.6 |
| 4,649,009 | 3/1987 | Shibata et al. | 264/235.8 |
| 4,652,409 | 3/1987 | Leese et al. | 264/290.2 |
| 4,652,490 | 3/1987 | Arita et al. | 428/347 |

FOREIGN PATENT DOCUMENTS

| | | | |
|---|---|---|---|
| 41-15588 | 9/1966 | Japan | 264/235.8 |
| 873220 | 7/1961 | United Kingdom | 264/235.8 |

OTHER PUBLICATIONS

JP 74-014-343 Toray Industries (filed Jun. 2, 1970 as 046856/70 Publ. Apr. 6, 1974 "Biaxially Oriented Polypropylene Composite Film".
JP 82-034-084 Tokuyama Soda KK (filed Dec. 28, 1972 as 66967/72, Publ. Jan. 17, 1975 as JP 50-004-161 as "Elastic Polyolefin Films".

*Primary Examiner*—Jeffery Thurlow
*Attorney, Agent, or Firm*—John E. Crowe; David Edwards

[57] ABSTRACT

Biaxially oriented film is post-treated by an annealing process in a limited temperature range of 45° C. to 120° C. for various time periods based on the temperature for annealing in order to produce a film having less than a 0.2% shrinkage in the machine direction as measured at 51.7° C. for 24 hours. This film has a wide range of uses, such as overwrapping film.

7 Claims, 1 Drawing Sheet

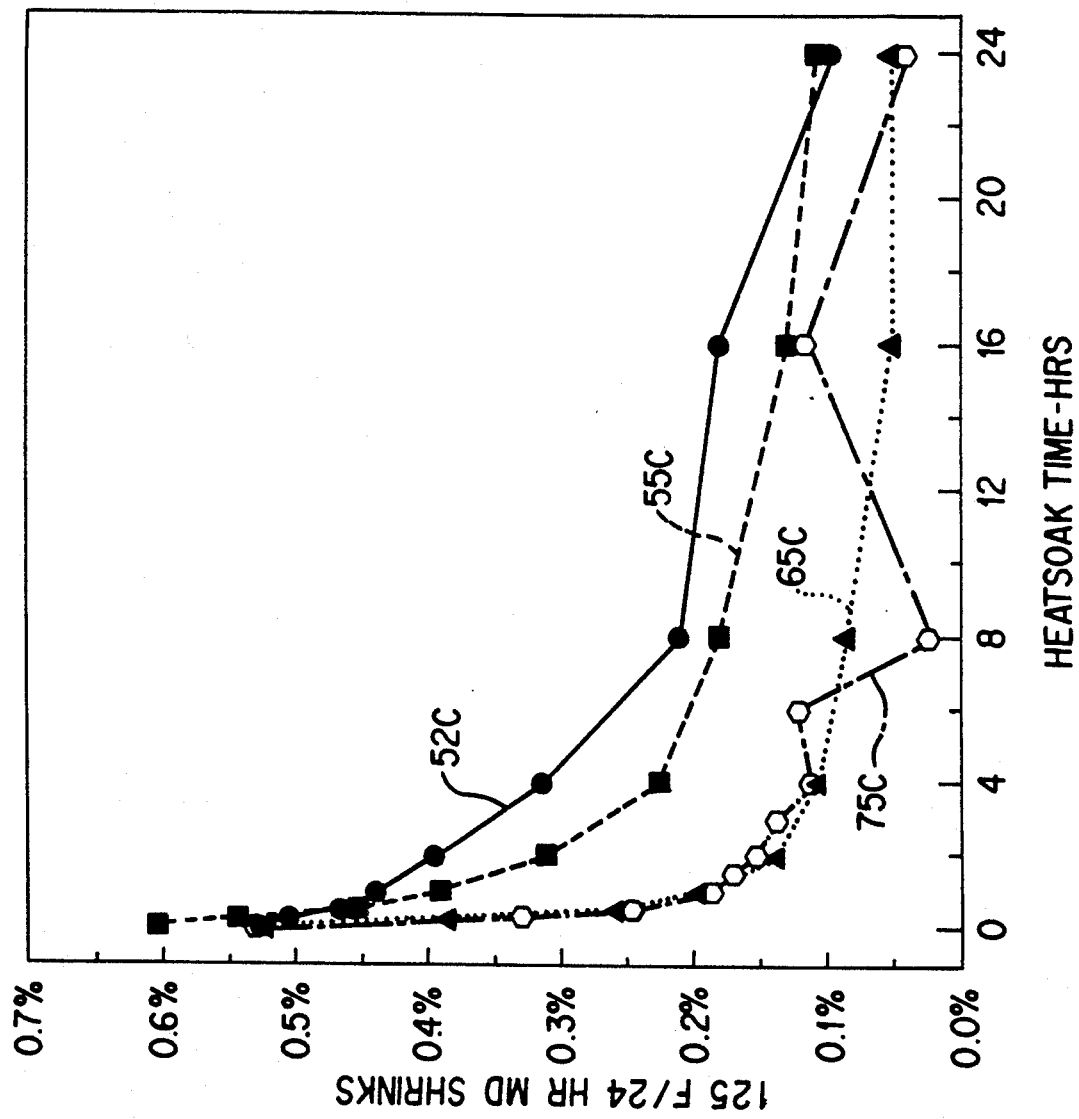

5,152,946

PRODUCING LOW SHRINK PACKAGING FILM

BACKGROUND OF THE INVENTION

The present invention is related to a process for heat treating a biaxially oriented film of a polyolefin, thermoplastic, crystallizable polymeric material and the resultant film.

A distinguishing characteristic of oriented packaging film is its capacity, upon exposure to some level of heat, to shrink or, if restrained, to create shrink tension within the film. The packaging film also has good transparency and gloss. In addition, it has excellent heat seal properties at low temperatures, sliding properties over a wide range of temperatures and releasing properties from a hot plate, all of which are desirable for packaging articles by the use of an automatic packaging machine.

In recent years, highly advanced requirements have been made in overwrapping and outerwrapping of a variety of products such as foods, tobacco, industrial goods and daily miscellaneous goods. In every instance, the appearance of the product is critical, especially on the shelf of a retailer. A critical requirement of wrapping film is that it has a low degree of shrinkage in order not to create variations in the film dimensions on aging. Variations in film dimensions over time can greatly detract from the appearance of packages wrapped in such materials either through distortion of the underlying package or by development of unsightly wrinkles in the film itself. Hence, dimensional stability of a wrapping film is critical to the appearance of the product that is wrapped.

There are many approaches in the prior art for achieving dimensional stability of oriented films. Commercial tenters are typically designed with a "heatset" section for achieving dimensional stability. This approach essentially involves decreasing the distance between the two tracks near the tenter's exit. By so doing, the film is permitted to contract at an elevated temperature so as to permit relaxation of residual stresses caused by orientation. However, film heatset in this way is prevented from undergoing any contraction in the longitudinal direction once its edges have been gripped by the tenter clips.

Other approaches for achieving dimensional stability of oriented films that have been proposed are, for example, a solvent absorption: desorption technique to reduce shrinkage at elevated temperatures in polyethylene terephthalate. By orienting at elevated temperatures, allowing unconstrained relaxation at low temperature, and finally constrained elevated temperature annealing, low shrink films made from polyethylene terephthalate have been prepared (Japanese patent 63,130,650). In addition, by orienting at temperatures above the polymer crystallization temperature, low shrink films made from polypropylene and ethylene-propylene copolymers have been manufactured (Japanese Patent 7,153,931).

SUMMARY OF THE INVENTION

This invention is directed to a process for treating biaxially oriented polyolefin film to increase its dimensional stability comprising annealing said polyolefin film in a temperature range of from about 45° C. to about 120° C. over a time period of from at least about 2 seconds at the higher end of the temperature range and at least about 48 hours at the lower end of the temperature range in an unconstrained condition in order to achieve shrink properties of less than 0.2% in the machine direction in the resultant annealed film (this shrink property is measured at 51.7° C. for 24 hours unconstrained).

Examples of annealing temperature/time relationships for achieving the desired low shrinkage properties are as follows:
i) at 52° C., for at least 24 hours,
ii) at 55° C., for at least 8 hours,
iii) at 65° C., for at least 2 hours, and
iv) at 75° C., for at least 1.5 hours.

This invention also relates to a biaxially oriented film having less that 0.2% unconstrained shrinkage properties prepared by the above mentioned process.

BRIEF DESCRIPTION OF THE DRAWING

The Figure is a graph showing the impact of heat-soak (annealing) in relation to machine direction shrinkage based on annealing at certain temperatures of a polypropylene film.

DETAILED DESCRIPTION OF INVENTION

The present invention is based on the discovery of temperature, machine draw parameters and film parameters that allow for control of resultant shrinkage of a polyolefin film. More particularly, it has been found that when biaxially oriented polyolefin films are annealed in a narrow temperature range over a period of time, that the film produced has a low degree of shrink, i.e., less than 0.2%.

The polyolefin film to which this invention is applicable can be either a single layer or a multi-layer of one or more homo- or co-polymers of alpha-olefins. Examples of the polyolefin are polypropylene, high density polyethylene, and ethylene/propylene copolymers and blends thereof. Optionally, the film can contain up to 30% of a hydrogenated terpene or petroleum resin having a molecular weight less than that of the polyolefin. When the film is a multi-layer, it can have a heat sealable layer of a random copolymer of propylene and 2 to 10 weight percent of ethylene. The polypropylene film is preferably an isotactic polypropylene with a density from 0.86 to 0.92 g/cc measured at 23° C. according to ASTM D1505 and a melt flow index of from 1 to 15 g/10 minute as determined according to ASTM D1238 (conditions 230° C. and 2.16 kg).

The basic processes for producing polymer films for use in accordance with the present invention to make the low shrinkage polymer film of this invention may be selected from the group of conventional processes for producing biaxially oriented polymer film, such as the tubular and tenter techniques. In the case of multi-layer films, either extrusion coating or coextrusion technique can be employed.

In general, in the tubular or bubble process, molten polymer is extruded from an annular die and then quenched to form a tube. The wall thickness of the tube is controlled partly by the annular die gap and partly by the relative speeds of extrusion and take-off. The tube passes through a set of slow running nip rolls and is then re-heated to a uniform temperature. Transverse drawing is achieved by increasing the air pressure in the tube, to inflate the tube to a preselected multiple of its original diameter. The air is trapped by a second set of nip rolls at the end of the tube remote from the extruder. These are generally driven at a faster speed than the first pair, thus causing drawing of the film in the machine direction. The tubular process thus obtains simultaneous transverse and longitudinal orientation.

In the tenter processes, the polymer is extruded through a slot die and quenched. The extruded sheet is normally oriented in two sequential steps. The first step is usually longitudinal orientation between nip rolls driven at different speeds. In the second stage, the film enters a tenter frame, where it is stretched laterally by means of diverging chains of clips. Whereas the bubble process operates at constant pressure, the tenter frame process operates at a constant rate of elongation. Somewhat higher stretching forces are required in the lateral stretching stage which may be carried out at slightly higher temperatures. This is mainly due to crystallization of the film during the longitudinal stretching operation. The tenter process can also be carried out as a simultaneous operation in which an extruded sheet with beaded edges is biaxially oriented in a tenter frame equipped with diverging roller grips rather than clips for holding and stretching the film.

The post-treatment step of annealing a biaxially oriented film is to provide appropriate additional post-processing thermal histories which achieve the desired improvement in low temperature shrink properties in the biaxially oriented film compositions of this invention. One such method involves placing rolls of film in a heated chamber. When this technique is employed, the samples should be either wound hot or annealed for a sufficiently long time to permit thermal equilibrium to be attained within the roll so as to avoid nonuniform shrink properties through the radial dimension of the roll. Control of the temperature of the roll during winding can be accomplished by passing the film over one or more heated rolls just prior to winding. More sophisticated nonisothermal annealing conditions may be employed based on heat transfer and process film property optimization considerations. Other approaches to film annealing will be evident to those skilled in the art. For example, this annealing technique is also possible by employing a heated oven in line following the film orientation process.

In general, the post-treatment step of annealing of this invention most desirably from a shrink improvement standpoint should be performed with a minimal tension on the film during the annealing process. If too high a tension coupled with a high temperature is employed, then it is possible to cause the shrink properties to deteriorate rather than improve. The biaxially oriented film should be post treated by annealing in a temperature range of from about 45° C. to about 120° C., more preferred 55° C. to 65° C., over a time interval from about 2 seconds to 48 hours, and preferred for at least 8 hours at the lower temperature range.

EXAMPLE

Coextruded films with a total thickness of 80 gauge (ga) having an isotactic polypropylene base layer containing 3% by weight of a hydrogenated hydrocarbon resin and having symmetric 2 ga ethylene/propylene copolymer (approximately 94% propylene) sealing layers on each side of the base layer. Each of the sealing layers also contains 0.3 weight percent of silicon antiblock agent, 0.3 weight percent of polydimethylsiloxane, and 0.08 weight percent of Armostat 310 antistatic agent. This structure is biaxially oriented by the tenter technique to impart a mechanical orientation of 500% in the machine direction and 900% in the transverse direction. Unconstrained strips of this film were annealed in an oven for various time periods and temperatures. The low temperature machine direction shrink properties of the annealed and unannealed reference strips were then determined by initially measuring the lengths of the samples, annealing at 125° F. (51.7° C.) for 24 hours, and remeasuring the samples to determine the change in machine direction (MD) dimensions.

The dimensional stability of samples annealed for several hours at temperatures greater than 52° C. was seen to improve significantly; this is evidenced by the graph of the Figure where the data obtained from tests were plotted with coordinates of 125° F. per 24 hours MD shrink versus heatsoak (annealing) time. This graph is based on the data contained in the following Table.

TABLE

| Heatsoak Time (hrs) | 125° F. (51.7° C.)/24 hr Shrinks (After Initial Annealing) | | | |
|---|---|---|---|---|
| | 52° C. | 55° C. | 65° C. | 75° C. |
| 0.00 | 0.53% | 0.60% | 0.52% | 0.53% |
| 0.25 | 0.51% | 0.54% | 0.39% | 0.33% |
| 0.50 | 0.46% | 0.45% | 0.26% | 0.24% |
| 1.00 | 0.44% | 0.39% | 0.20% | 0.19% |
| 1.50 | | | | 0.17% |
| 2.00 | 0.40% | 0.31% | 0.14% | 0.15% |
| 3.00 | | | | 0.14% |
| 4.00 | 0.31% | 0.22% | 0.10% | 0.11% |
| 6.00 | | | | 0.12% |
| 8.00 | 0.21% | 0.18% | 0.08% | 0.02% |
| 16.00 | 0.18% | 0.13% | 0.05% | 0.12% |
| 24.00 | 0.10% | 0.11% | 0.05% | 0.04% |

Although the invention has been described with reference to particular means, materials and embodiments, from the foregoing, one skilled in the art can ascertain the essential characteristics of the present invention; and various changes and modifications may be made to various usages and conditions without departing from the spirit and scope of the invention as described in the claims that follow.

What is claimed is:

1. A process for increasing stability of formed and biaxially oriented polyolefin film comprising heat treating said formed and biaxially oriented polyolefin film under unconstrained conditions within a temperature range of from about 45° C. to about 120° C. over a corresponding time period of from at least about 48 hours to not more than about 2 seconds to obtain a film having shrink properties of less than about 0.2% measured in the machine direction.

2. The process of claim 1 wherein the polyolefin film is an alpha-olefin homopolymer or copolymer having 2 to 5 carbons.

3. The process of claim 2 wherein the alpha-olefin is polypropylene.

4. The process of claim 1 wherein the treating step is effected at a time/temperature relationship defined by parameters selected from the group consisting of
 i) not less than 24 hours at 52° C.,
 ii) not less than 8 hours at 55° C.,
 iii) not less than 2 hours at 65° C.,
 iv) not less than 1.5 hours at 75° C.

5. The process of claim 4 wherein the surface layer comprises 1 to 20%, based on the weight of the core layer, of a copolymer of ethylene/propylene containing 92 to 97% by weight of propylene.

6. The process of claim 5 wherein the formed and biaxially oriented film comprises isotactic polypropylene having a density from abut 0.86 to about 0.92 g/cc measured at 23° C., a melt flow index of from 1 to 15 g/10 minutes, orientation of 500% in the machine direction and 900% in the transverse direction.

7. The process of claim 1 wherein the polyolefin film is a laminate having (a) a core layer comprised of 70% to 100% by weight of polypropylene and 0% to 30% by weight hydrogenated terpene or petroleum resin having a molecular weight less than that of said polyolefin, plus (b) at least one heat sealable surface layer.

* * * * *